United States Patent
Fagard (10) Patent No.: US 7,319,456 B2
(45) Date of Patent: Jan. 15, 2008

(54) PROXIMITY DETECTION MATRIX DISPLAY DEVICE

(75) Inventor: Pierre Fagard, Elancourt (FR)

(73) Assignee: Thales, Paris (FR)

( * ) Notice: Subject to any disclaimer, the term of this patent is extended or adjusted under 35 U.S.C. 154(b) by 208 days.

(21) Appl. No.: 10/470,714

(22) PCT Filed: Feb. 5, 2002

(86) PCT No.: PCT/FR02/00439

§ 371 (c)(1),
(2), (4) Date: Jul. 30, 2003

(87) PCT Pub. No.: WO02/065389

PCT Pub. Date: Aug. 22, 2002

(65) Prior Publication Data

US 2004/0066367 A1 Apr. 8, 2004

(30) Foreign Application Priority Data

Feb. 13, 2001 (FR) .................................. 01 01941

(51) Int. Cl.
*G09G 5/00* (2006.01)
(52) U.S. Cl. .................................................... 345/173
(58) Field of Classification Search .................. 345/62, 345/176, 174, 173, 55; 178/18.01, 19.01; 200/600; 349/12; 715/701
See application file for complete search history.

(56) References Cited

U.S. PATENT DOCUMENTS

| | | | |
|---|---|---|---|
| 5,581,274 A * | 12/1996 | Tagawa | 345/104 |
| 6,141,371 A | 10/2000 | Holmes et al. | |
| 6,239,788 B1 * | 5/2001 | Nohno et al. | 345/173 |
| 6,326,936 B1 * | 12/2001 | Inganas et al. | 345/55 |
| 6,680,731 B2 * | 1/2004 | Gerpheide et al. | 345/173 |

FOREIGN PATENT DOCUMENTS

| | | |
|---|---|---|
| EP | 0 987 829 | 3/2000 |
| WO | 01/77705 | 10/2001 |

OTHER PUBLICATIONS

B. Roturier, "Report on DME Interference on GPS/LS" (third version), (1999), Report by Eurocontrol (EATMP, SMA), 'en linge!, Sep. 3, 2001, (Sep. 3, 2001), XP002214743.

Landry et al., "Analysis of Potential Interference Sources and Assessment of Present Solutions for GPS/GNSS Receivers", Ins International Conference on Intergrated Navigation, Saint Petersburg, Russia, (1997), 'en ligne! XP002214744.

* cited by examiner

*Primary Examiner*—Richard Hjerpe
*Assistant Examiner*—Abbas I. Abdulselam
(74) *Attorney, Agent, or Firm*—Lowe Hauptman Ham & Berner, LLP (57) ABSTRACT

The invention concerns an electronic display device comprising means of detection of proximity of a conducting element situated in proximity to a display zone of the device, a set of row electrodes (4) and of column electrodes scanning the display zone, means for generating an excitation of the row electrodes and of the column electrodes as a function of an image to be displayed on the display zone. The proximity detection means comprise:

means (7) for applying a specific electrical signal distinct from the excitation to said set, means (8) for detecting modifications of the specific electrical signal which are induced by the presence of a conducting element in proximity to a region of the display zone, and means (15) for determining the position of said region as a function of said detected modifications.

18 Claims, 5 Drawing Sheets

PROXIMITY DETECTION MATRIX DISPLAY DEVICE

CROSS-REFERENCE TO RELATED APPLICATIONS

The present application is based on International Application No. PCT/FR02/00439 filed on Feb. 5, 2002, which in turn corresponds to FR 01/01941 filed on Feb. 13, 2001, and priority is hereby claimed under 35 USC § 119 based on these applications. Each of these applications is hereby incorporated by reference in their entirety into this application.

BACKGROUND OF THE INVENTION

The invention concerns a matrix display device comprising proximity detection means. Such devices are used in particular for the construction of communication terminals of the type allowing an operator to transmit and to receive information within the framework of a friendly exchange with a processor. The invention finds a particular application in respect of the screens of interactive terminals comprising screens based on liquid crystals, on plasma, on light-emitting diodes or on field-effect emission.

DESCRIPTION OF RELATED ART

It is known to construct such terminals by arranging one or more transparent touch areas on the device, these being based on contact or on capacitive or inductive effect or the like. The device can then serve to delimit pressing zones of this area according to a desired composition. The pressing of the area is usually done by a finger of an operator. The visual information provided by the device is inevitably attenuated by the add-on touch areas.

To remedy this problem, European patent EP 0 340 096 proposes that the surface of the counter-electrode of a liquid crystal screen be used as replacement for add-on touch areas. The surface of this counter-electrode is large in relation to the surface of the finger of the operator, this being well suited to the detection of a finger by capacitive effect. Such an embodiment is well suited to a liquid crystal screen comprising icons or characters which are predefined during the building of the screen. By way of example, such a screen allows the displaying of numerical characters each composed of seven segments which may either be lit or unlit. A counter-electrode of this type of screen generally covers one or more predefined locations of characters.

An embodiment in accordance with patent EP 0 340 096 cannot be used to embody a touch surface from a matrix screen comprising two arrays of electrodes defining, on the one hand, the rows and, on the other hand, the columns of the matrix of the screen. Specifically, such a screen comprises no counter-electrode of surface in relation to the surface of a conducting element to be detected, as for example the finger of an operator.

SUMMARY OF THE INVENTION

The aim of the invention is to embody in a simple manner a matrix display device comprising proximity detection means. Accordingly, the subject of the invention is an electronic display device comprising means of detection of proximity of a conducting element in a display zone of the device. Stated otherwise, the electronic display device comprises means of detection of proximity of a conducting element situated in proximity to a display zone of the device. The electronic display device furthermore comprises a set of row electrodes and of column electrodes scanning the display zone, means for generating an excitation of the row electrodes and of the column electrodes as a function of an image to be displayed on the display zone. The display device is characterized in that the proximity detection means comprise:
  means for applying a specific electrical signal distinct from the excitation to said set,
  means for detecting modifications of the specific electrical signal which are induced by the presence of a conducting element in proximity to a region of the display zone,
  and means for determining the position of said region as a function of said detected modifications.

The devices in accordance with the invention make it possible not to fix the pressing zones during the building of the matrix screen. Specifically, the means for detecting the position of said region can detect the presence and the position of a conducting element situated in the immediate vicinity of the display zone. The pressing zones are no longer limited in terms of number, dimension and position and can be positioned and moved over the entire display zone during the use thereof. It is always of course possible to delimit the pressing zones by a suitable display.

Furthermore, the devices in accordance with the invention make it possible to avoid any attenuation of the visual information displayed by the device.

DETAILED DESCRIPTION OF THE DRAWINGS

The invention will be better understood and other advantages will become apparent on reading the detailed description of several embodiments given by way of example. The description is illustrated by the appended drawing in which.

DETAILED DESCRIPTION OF THE INVENTION

Figure 1A:
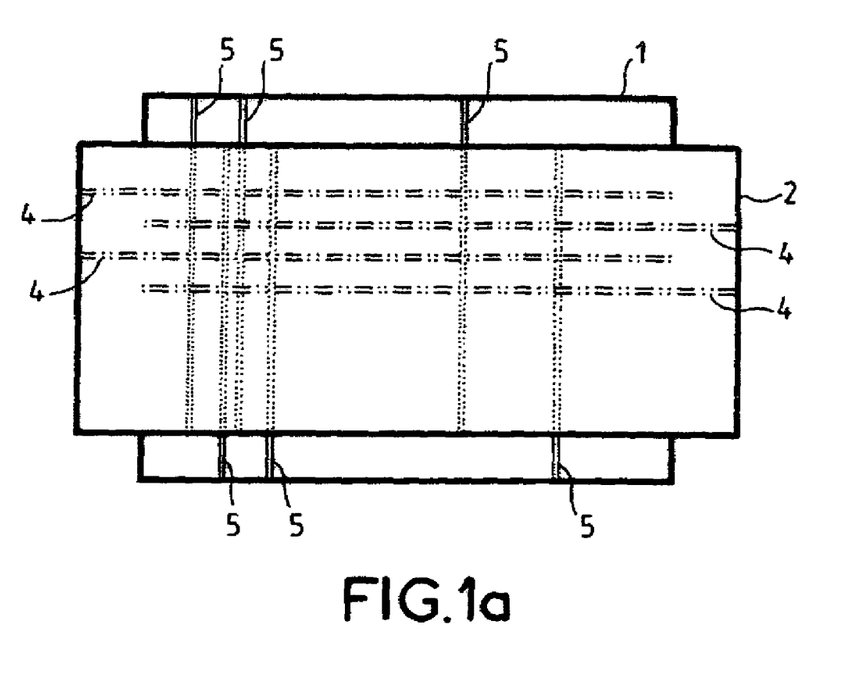
FIG. 1*a* represents a front view of the structure of a matrix display device.
Figure 1B:
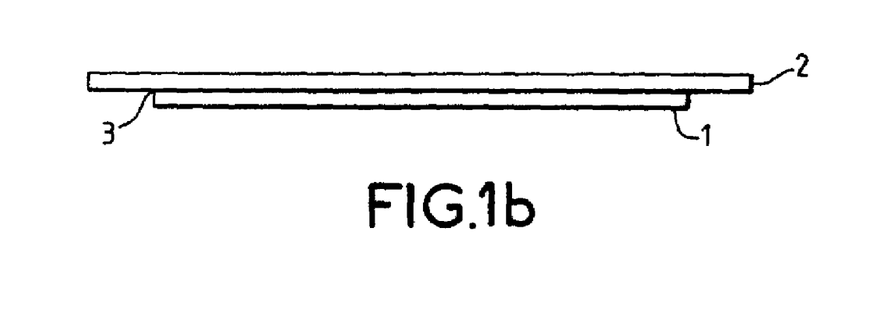
FIG. 1*b* represents this same device in profile.

The matrix display device represented in FIGS. 1*a* and 1*b* comprises two insulating plates 1 and 2 arranged one above the other. At least one of the two plates 1 or 2 is transparent. The device also comprises a layer 3 made from a material exhibiting electro-optical properties able to transmit or otherwise a luminous radiation under the effect of an electrical excitation. This material comprises for example liquid crystal. The device furthermore comprises two arrays 4 and 5 of electrodes. The first array 4 defines the rows of the matrix of the device and the second array 5 defines the columns of the matrix of the device. In FIG. 1*a*, only a few electrodes of each array 4 and 5 have been represented by way of example. It is of course understood that the invention may be implemented regardless of the number of electrodes of each array. By way of information, the displays commonly employed in portable screens generally comprise more than 100 electrodes per array. Advantageously, the electrodes 4 and 5 are made of a material comprising indium-tin oxide. This material has the advantage of being transparent to luminous radiation.

The first electrode array 4 is situated between the plate 2 and the layer 3. The second electrode array 5 is situated between the plate 1 and the layer 3. The electrical excitation of the layer 3 is achieved by applying a potential difference between an electrode of each array. The potential difference is, for example, due to a low-frequency AC voltage of the order of 50 to 1 000 Hertz.

Advantageously, the electrodes 4 and 5 of the two arrays are interdigitated. More precisely, for each array, one electrode out of two is furnished with a point of electrical connection situated in the vicinity of an edge of the corresponding plate. The points of connection of the other electrodes of the same array are situated on the opposite edge of the same plate. This makes it possible in respect of the device to space out the connection points and, consequently, to increase the insulation between two neighboring connections. The advantage afforded by the interdigitated structure for improving the detection of the position of a conducting element will be seen later in the description.

Figure 2:
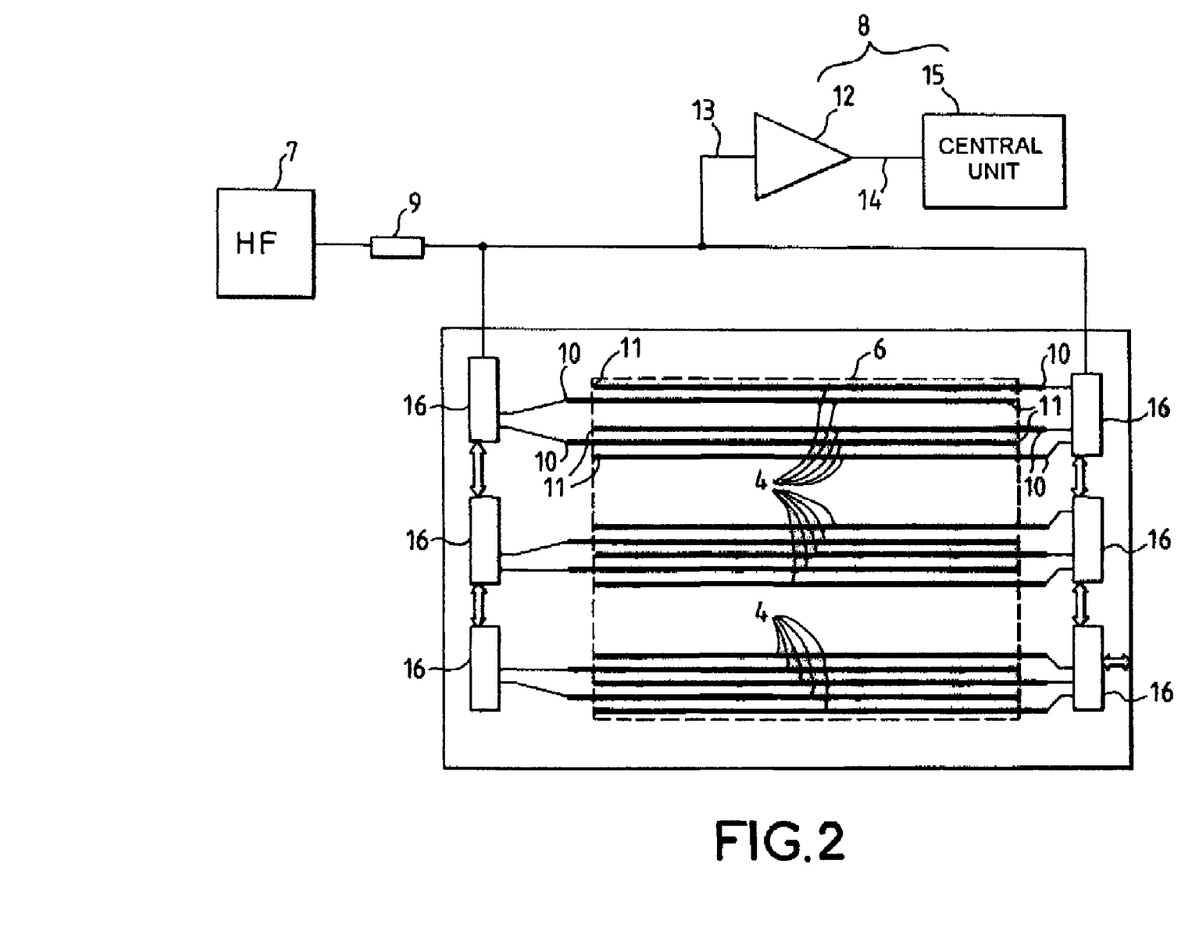
FIG. 2 represents the means of the invention which are associated with one of the electrode arrays.

In a first variant, described with the aid of FIG. 2, the row electrodes and the column electrodes respectively form two distinct arrays. At least one array is chosen for the proximity detection. The means for determining the position of said region define this position as a function of the level of said modifications intervening on the chosen array.

More precisely, the electrode array 4 is, for example, used as sensitive element. The display zone forms the touch surface 6. The device comprises electronic means 7 for generating a specific electrical signal applied to the electrode array 4. The specific electrical signal is distinct from the electrical excitation applied between the electrodes 4 and 5 of the two arrays to modify the state of the liquid crystal. Advantageously, the specific electrical signal is a high-frequency signal of frequency above 100 kilohertz. The device furthermore comprises electronic means 8 able to detect modifications of the electrical signal which are due to the presence of an electrically conducting element, such as, for example, the finger of an operator, in proximity to the electrode array 4.

The electronic means 7 are, for example, linked to an electrode 4 by way of an impedance 9 which can have a value of the order of 500 ohms to a few kilo-ohms. When the electrical signal is applied to an electrode 4, the behavior thereof can be compared with that of an impedance whose value is of the order of several hundreds of kilo-ohms at the frequency of the specific electrical signal. On the other hand, when a conducting element is arranged in the vicinity of the electrode 4, the latter then behaves as an impedance whose value decreases. This value may drop, for example, down to 10 kilo-ohms, or even less. This value is dependent on the position of the conducting element along the electrode 4. Here, one exploits the fact that the electrodes 4 have a nonzero line impedance when a high-frequency electrical signal is applied to them. The closer the conducting element is to an end 10 of the electrode 4, the end closest to the impedance 9, the more the value of its impedance falls. Conversely, the closer the conducting element is to the other end 11, the so-called "outboard end", the more the impedance of the electrode grows. Specifically, the electrode 4 forms a resistive line whose resistance increases with the distance separating the end 10 from the point of detection of the conducting element.

The measurement of variation of the impedance of the electrode 4 therefore makes it possible to determine the position of the conducting element along the electrode 4. This measurement may be made indirectly by detecting, between the impedance 9 and the electrode 4, the modification of the specific electrical signal with the aid of electronic means 8. These means comprise, for example, an amplitude demodulator 12 whose input 13 is connected between the impedance 9 and the electrode 4. The output 14 of the amplitude demodulator 12 provides a central unit 15 with a signal representative of any modification of the specific electrical signal. The central unit 15 can compare the signal from the amplitude demodulator 12 with a stored value table, which table gives the correspondence between the modification of the electrical signal and the position of the conducting element along the electrode 4.

The modification of the electrical signal as well as its detection have been described in relation to a single electrode 4, this making it possible to determine the position of a conducting element along this electrode 4. Moreover, to completely determine the position of the sensitive element with respect to the touch surface 6, it is necessary to know alongside which electrode 4 of the array the conducting element is located.

The determination of the electrode 4 concerned may be effected by using, for each electrode 4, an impedance 9 and particular electronic means 8. This solution is unwieldy and, advantageously, the electrical signal is not applied simultaneously but successively to the various electrodes of the array. This makes it possible to use an impedance 9 and means 8 which are common to several electrodes 4 grouped together into a set of electrodes 4 in which the signal is applied successively. There may be one or more sets of electrodes 4 in one and the same array.

The redundancy of the detection may be improved. Specifically, matrix displays comprise at least two electrode arrays 4 and 5, as described with the aid of FIG. 1*a*. It is advantageous to use these two arrays as sensitive element of the touch surface. By using two electrode arrays 4 and 5 which are, for example, orthogonal, it is moreover possible to determine the dimensions of a conducting element placed in proximity to the touch surface 6. Specifically, each electrode 4 or 5 influenced by the conducting element makes it possible to define the distance between its end 10 and an extremity of the conducting element.

In a second variant, it is also possible to use the two electrode arrays 4 and 5 in a simpler manner without seeking to determine the distance separating a conducting element from the end 10 of an electrode 4 or 5. The specific electrical signal is applied both to the electrodes 4 and to the electrodes 5. The central unit 15, in order to determine the position of said region, defines this position as a function of at least one electrode 4 and of at least one electrode 5 for which said modifications overstep a threshold.

In this case, one is content with determining whether or not a conducting element is present in the vicinity of an electrode 4 or 5. By knowing at least one electrode 4 and at least one electrode 5, where the conducting element is detected, its position is determined in a Cartesian reference frame whose measurement units are the electrodes 4 for one direction and the electrodes 5 for the other direction. The specific electrical signals are then applied both to the rows and to the columns of electrodes 4 and 5, and the central unit 15 determines the position of the conducting element as a function of at least one electrode 4 and one electrode 5 for which the modifications of specific electrical signals overstep a threshold. The embodiment of the amplitude demodulator is then simplified. It will simply have to deliver to the central unit 15 an item of information regarding the overstepping or otherwise of a threshold by the modified specific electrical signal.

Figure 3:
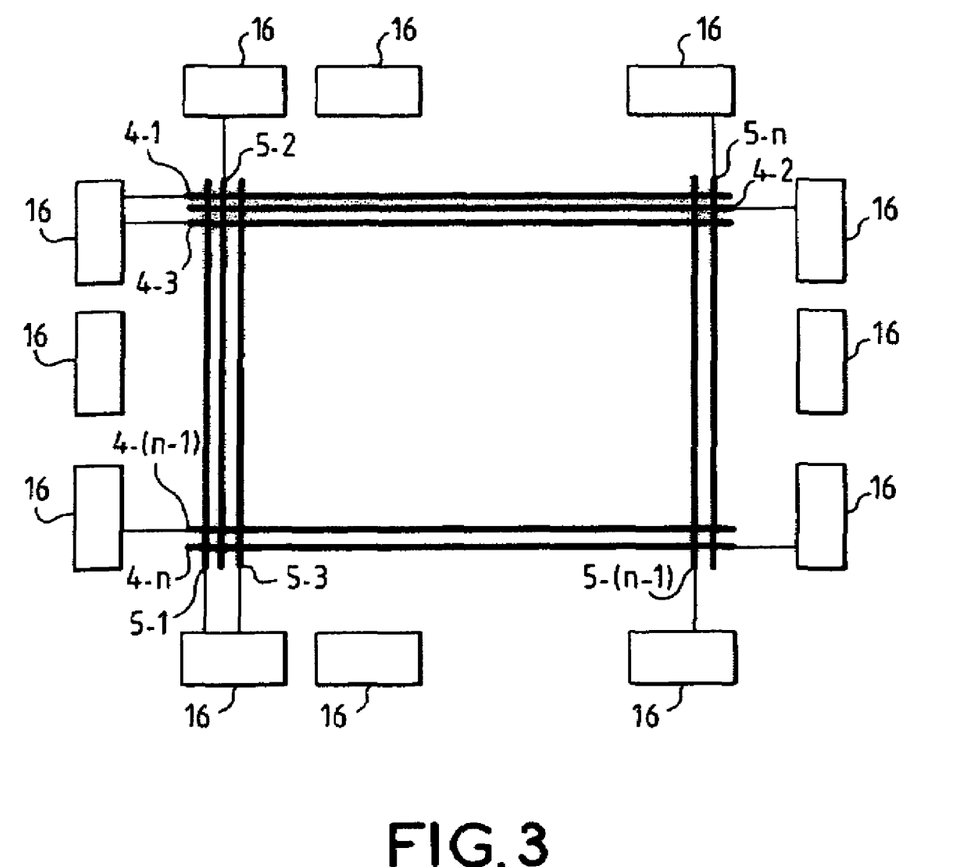
FIG. 3 represents an embodiment of the invention using row electrodes and also column electrodes.

In a third variant, described with the aid of FIG. 3, the display device comprises the electrode array 4, the electrode array 5, as well as means 16 for driving the display. In this variant, the specific electrical signal, generated by the means 7 (not represented in FIG. 3), is applied simultaneously to at least one row electrode 4 and to at least one column electrode 5. Couplings between the row electrode 4 and the column electrode 5 are modified when the conducting element is in proximity to the crossover between the row electrode 4 and the column electrode 5. The specific electrical signal is advantageously applied to a set formed by the two electrode arrays 4 and 5 diagonally.

More precisely, the electrodes 4 bear a serial number from 4-1 to 4-n. The same goes for the electrodes 5 which bear a number from 5-1 to 5-p. p and n represent integers. The electrical signal is applied successively to the electrodes 4 in the order from 4-1 to 4-n. At the same time, the electrical signal is applied successively to the electrodes 5 in the order from 5-1 to 5-p. The electrical signal is applied simultaneously to at least one electrode 4 and to at least one electrode 5. Couplings between the electrode 4 and the electrode 5 are modified when the conducting element is in proximity to the crossover between the electrode 4 and the electrode 5. These couplings represent an impedance formed between these two electrodes. At the start of a sequence, the electrical signal is applied to the electrode 4-1 and to the electrode 5-1. Thereafter, the electrical signal is applied to the electrodes 4-2 and 5-2 and so on and so forth. When the numbers n and p are equal, this sequence continues until they are reached. When these numbers are different, for example when p is greater than n, the electrical signal can be applied to an electrode 4-i and an electrode 5-j and then at the following instant to the electrode 4-i again and to the electrode 5(j+1). i represents an integer lying between 1 and n and j another integer lying between 1 and p. This double application of the electrical signal to one of the electrodes 4 is repeated as often as necessary such that, at the last instant of the sequence, the electrical signal is applied to the electrodes 4-n and 4-p. If several double applications are necessary, one chooses electrodes 4-i substantially distributed between 1 and n. It is thus possible to traverse a diagonal or possibly both diagonals of the display zone.

A measurement readout is thus obtained allowing map location, by virtue of the couplings existing between the electrodes 4 and the electrodes 5. More precisely, the map consists in storing the level of the electrical signal, possibly modified by the presence of a conducting element, for each pair of electrodes 4 and 5 for which the electrical signal is applied simultaneously. The entire set of these levels forms a so-called current table. The current table is thereafter compared with several prerecorded tables, each representing a detectable position of the conducting element in proximity to the display zone. When the current table comprises values substantially equal to those of a prerecorded table, the position of the conducting element is deduced therefrom. This map can also be utilized, by exploiting the process described in French patent application FR 2 757 659 filed in the name of SEXTANT AVIONIQUE as if the proximity detection surface were continuous.

The electrical signal modification detected by the electronic means 8 is of low level and may be disturbed by numerous phenomena such as, for example, electrical interference. To alleviate this problem, the display device advantageously comprises electronic means able to aggregate the modifications of the electrical signal detected by the means 8. These electronic means may be formed by the central unit 15. The aggregate is effected over several neighboring electrodes. In practice, when the user's finger is placed on the display, with a view to an action by means of the touch surface, it systematically covers several electrodes 4, for example from 10 to 30 electrodes 4. There are therefore no repercussions in not taking account of a modification of the electrical signal intervening on only one electrode 4, or even on a very restricted number of neighboring electrodes 4, for example 5 electrodes 4. The central unit 15 can therefore interpret modifications of the electrical signal, modifications which intervened on neighboring electrodes 4, as a presence of a conducting element, only when the modification concerns at least a certain number of neighboring electrodes 4. The number of electrodes 4 is then determined by their spacing. In the same manner, modifications of the electrical signal which intervened on a larger number of non-neighboring electrodes 4 will not be taken into account either.

It was seen previously, in the first variant, that the level of the modification due to the presence of a conducting element was dependent on the position of the conducting element along an electrode 4. It is consequently possible to add an additional condition during the interpretation of the modifications of the electrical signal which intervened on several neighboring electrodes 4. The central unit 15 can therefore interpret modifications which intervened on neighboring electrodes 4 as a presence of a conducting element only when these modifications are of substantially equal level.

Advantageously, the specific electrical signal is applied successively to various electrodes 4 or 5. This makes it possible to avoid any couplings between neighboring electrodes, more particularly between electrodes of the same array. Specifically, the proximity of a conducting element modifies the impedance of an electrode in the vicinity of which it is located. This modification is generally very weak and a coupling between two electrodes is liable to mask this modification, hence the benefit of avoiding couplings between neighboring electrodes.

Furthermore, it has been noted, in the use of the first variant, that the level of modification, in this instance of attenuation, is not a linear function of the position of the conducting element along an electrode 4. More precisely, for one and the same displacement of the conducting element along the electrode 4, the variation in the level of the electrical signal is larger in the vicinity of the end 10 of the electrode 4, the end closest to the impedance 9 than in the vicinity of the end 11, the so-called free end of the electrode 4. Consequently, the sensitivity of the measurement of position of the conducting element along the electrode 4 is much better in the vicinity of the end 10.

To alleviate this defect, it is possible to exploit an interdigitated structure of the electrode array or arrays 4 used as sensitive element. With such a structure, the accuracy of the position of the conducting element along several neighboring electrodes 4 will be obtained with the electrode 4 for which the conducting element is closest to its end 10.

In the first variant, the use of the interdigitated structure also makes it possible to increase the redundancy of the measurements of the position of the sensitive element along several neighboring electrodes 4. The interdigitated structure furthermore makes it possible to discriminate between two conducting elements placed simultaneously on the touch surface 6 in proximity to several neighboring electrodes 4. Specifically, the electrodes 4 connected at their end 10 in the vicinity of an edge of the touch surface 6 make it possible to determine the position of the conducting element closest to this end 10. On the other hand, the electrodes 4 connected at their end 10 in the vicinity of the opposite edge of the touch surface will make it possible to determine the position of the other conducting element.

Moreover, the set of influenced electrodes, when these arrays have an interdigitated structure, makes it possible to define the contour of the conducting element. When an operator places both a hand and a finger on the touch surface 6, the central unit 15 can use the information defining the contours of the hand and of the finger so as, for example, to take only the finger and not the hand into account.

It was seen previously that the conducting element may be the finger of an operator. By way of variant, the conducting element can comprise a conducting stylus held by the operator. This stylus comprises an end that the operator can place on the display. Advantageously, the surface area of this end is sufficient to cover up several neighboring electrodes 4 or 5. The stylus affords electrical conduction between the end intended to be placed on the device and the body thereof held by the operator. This makes it possible to modify the electrical signal applied to the electrode or electrodes considered by capacitive effect. By way of alternative, the stylus may be linked by a wire connection to the earth of the means 7 generating the electrical signal.

Advantageously, the specific electrical signal has a frequency above 100 kilohertz. This makes it possible to use a capacitive effect to detect the presence of the conducting element in proximity to the display zone.

Advantageously, the device comprises means 16 for driving the display. The means are known as a driver. The means 16 comprise a multiplexer 17 intended to apply an excitation voltage 22 and the specific electrical signal to an electrode 4 selected for the display. This makes it possible to apply the specific electrical signal to the electrodes chosen for the proximity detection cyclically. More precisely, a specific electrical signal is applied successively to the set of electrodes chosen in a predetermined order, then this application is repeated in the same order, for as long as one seeks to detect the proximity of a conducting element.

Figure 4:
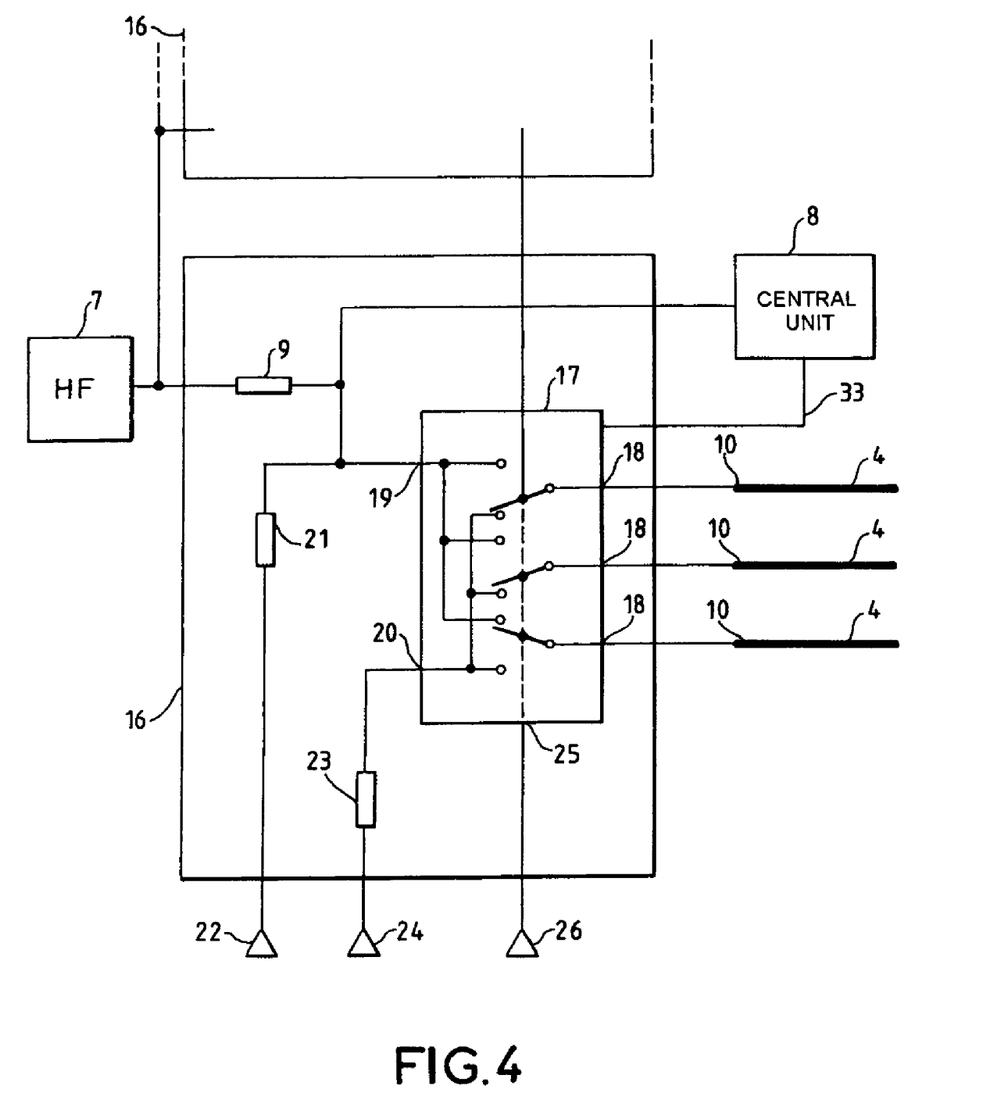
FIG. 4 represents an exemplary embodiment of means for driving the display, which embodiment is adapted to the invention.

An exemplary embodiment of the means 16 for driving the display is represented in FIG. 4. The means 16 comprise a multiplexer 17 whose outputs 18 are connected to the ends 10 of the electrodes 4. It is of course understood that the means 16 may be used with the electrodes 5. The multiplexer comprises two inputs 19 and 20 to which voltage sources are connected. A voltage 22 that the multiplexer 17 sends to an electrode 4 selected to carry out a display is available on the input 19, by way of an impedance 21. A voltage 24 that the multiplexer 17 sends to an electrode 4 not selected to carry out a display is available on the input 20, by way of an impedance 23. The voltages 22 and 24 form the electrical excitation of the layer 3. The input 19 is also connected to the impedance 9 which belongs to the means 16. This input 19 is also connected to the means 8 which are common to several means 16. The means 8 are, consequently, exterior to the means 16. The impedances 9 and 21 allow the superposition of the electrical signal sent by the means 7 and of the electrical excitation formed by the voltage sent to the selected electrode 4. The multiplexer 17 furthermore comprises an input 25 controlling the multiplexer. To this input 25 is connected a link 26 on which flows a signal making it possible to select the electrode 4 which receives the voltage 22 and the electrical signal emanating from the means 7 by way of the impedances 9 and 21.

Figure 5:
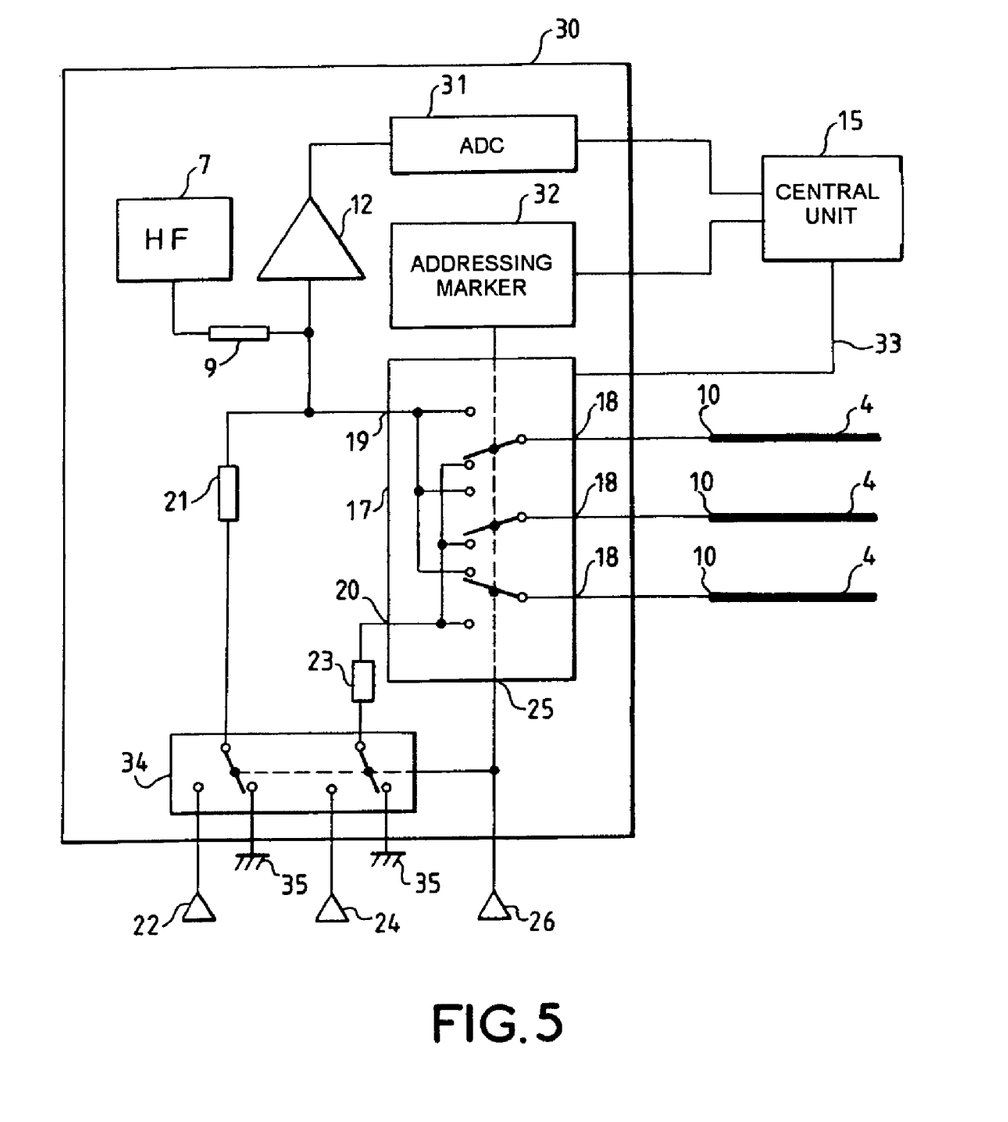
FIG. 5 represents another exemplary embodiment of means for driving the display, which embodiment is also adapted to the invention.

A variant embodiment of the means for driving the display is represented in FIG. 5. This variant here bears the reference 30. As previously, the means 30 comprise the multiplexer 17 and the impedances 9, 21 and 23. The multiplexer 17 receives the voltage 22 on its input 19 by way of the impedance 21 and the voltage 24 on its input 20 by way of the impedance 23. It also receives the link 26 on its input 25. Moreover, the means 30 comprise the electronic means 7 generating the specific electrical signal, the amplitude demodulator 12, advantageously synchronized with the electronic means 7, an analog/digital converter 31 and an addressing marker 32. The analog/digital converter 31 receives an item of information representative of the modifications, which item of information emanates from the amplitude demodulator 12 and provides a digital item of information to the central unit 15 which is exterior to the means 20. The addressing marker 32 receives an information item from the multiplexer 17 making it possible to identify the electrode 4 receiving the electrical signal. The addressing marker adapts this information item so as to transmit it to the central unit 15. The central unit 15 can then associate the modified electrical signal emanating from the analog/digital converter 31 and the electrode 4 considered.

In FIGS. 4 and 5 described previously, the central unit 15 can be linked to the multiplexer 17 by a link 33 allowing the central unit 15 to control the multiplexer 17. The link 33 links each multiplexer 17 to the central unit 15. The link 33 supplements the link 26 which links the set of multiplexers 17 also to the central unit 15. Advantageously, the multiplexers 17 are linked in a chain by means of the link 26.

Advantageously, the specific electrical signal is superimposed on the excitation. This makes it possible not to interrupt the excitation necessary for the display to apply the specific electrical signal to the electrode considered.

In certain display devices, for example bistable ones, the excitation necessary for display is not applied regularly to the electrodes, but only when the display is modified. The specific electrical signal can then be applied to an electrode 4 or 5 when the excitation is not applied to this electrode. Specifically, provision may be made for the means 16 or 30 for driving the display to comprise a disabling switch 34 making it possible either to apply the voltages 22 and 24 to the inputs 19 and 20, or to link these inputs 19 and 20 to an earth 35. The disabling switch 34 is represented in FIG. 5. The input 19 nevertheless remains linked to the means 7. The disabling switch 34 is controlled by the signal flowing on the link 26. When the inputs are linked to earth, the link 33 can still control the multiplexer 17 so as to apply the specific electrical signal to the electrodes 4.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An electronic display device comprising:
   means of detection of proximity of a conducting element situated in proximity to a display zone of the device;
   a set of row electrodes and of column electrodes scanning the display zone;

means for generating an excitation of the row electrodes and of the column electrodes as a function of an image to be displayed on the display zone, comprising switches for applying the excitation successively to each of the row electrode and to each of the column electrodes;

means for applying a specific electrical signal distinct from the excitation successively to each of the row electrode and to each of the column electrodes through the switches, means for continuously detecting modifications of the specific electrical signal which are induced by the presence of a conducting element in proximity to a region of the display zone, and means for determining the position of said region as a function of said detected modifications.

2. The device as claimed in claim 1, wherein the row electrodes and the column electrodes respectively form two distinct arrays, in that at least one array of electrodes is chosen for the proximity detection, and in that the means for determining the position of said region define this position as a function of the level of said modifications intervening on the chosen array.

3. The device as claimed in claim 1, wherein the specific electrical signal is applied both to the rows and to the columns, and in that the means for determining the position of said region define this position as a function of at least one row and of at least one column for which said modifications overstep a threshold.

4. The device as claimed in claim 1, wherein the electrical signal is applied simultaneously to at least one row electrode and to at least one column electrode and in that couplings between the row electrode and the column electrode are modified when the conducting element is in proximity to the crossover between the row electrode and the column electrode.

5. The device as claimed in claim 4, wherein the specific electrical signal is applied to said set diagonally.

6. The device as claimed in claim 5, wherein the electrical signal is applied to said set along two diagonals of the display zone.

7. The device as claimed in claim 1, wherein the means for determining the position of said region take no account of the modifications unless they intervene on several neighboring electrodes.

8. The device as claimed in claim 1, wherein the specific electrical signal is applied successively to various electrodes.

9. The device as claimed in claim 1, wherein the electrodes are interdigitated.

10. The device as claimed in claim 1, wherein the conducting element comprises a stylus.

11. The device as claimed in claim 1, wherein the specific electrical signal has a frequency above 100 kilohertz.

12. The device as claimed in claim 1, wherein it comprises means for driving the display, and in that these means comprise a multiplexer intended to apply an excitation voltage and the specific electrical signal to an electrode selected for the display.

13. The device as claimed in claim 12, wherein the means for driving the display furthermore comprise means generating the specific electrical signal, an amplitude demodulator and an analog/digital converter, the amplitude demodulator receiving the specific electrical signal and providing the analog/digital converter with a signal representative of said modifications.

14. The device as claimed in claim 1, wherein the specific electrical signal is superimposed on the excitation.

15. The device as claimed in claim 1, wherein the specific electrical signal is applied to an electrode when the row and column electrodes are not selected for region detection.

16. The device as claimed in claim 1, wherein the first electrode array is formed from the row electrodes and is situated between a plate and a layer and a second electrode array formed from the column electrodes is situated between another plate and the layer and wherein electrical excitation of the layer is achieved by applying a potential difference between an electrode of each array.

17. The device as claimed in claim 1, wherein drivers are used for driving the display to apply the excitation voltage and the specification electrical signal to an electrode selected for the display.

18. The device as claimed in claim 1, wherein the device comprises means for driving the display such that drivers are used to apply the excitation voltage and the specific electrical signal to an electrode selected for the display.

* * * * *